United States Patent [19]

Drexel et al.

[11] Patent Number: 4,474,547
[45] Date of Patent: Oct. 2, 1984

[54] GAS SUPPLY DOSING DEVICE FOR EXPLOSIVE MIXTURES

[75] Inventors: Peter Drexel, Steinenbronn; Hans-Dieter Kaden, Reutlingen; Helmut Martini, Weil der Stadt, all of Fed. Rep. of Germany

[73] Assignee: Robert Bosch GmbH, Stuttgart, Fed. Rep. of Germany

[21] Appl. No.: 315,231

[22] Filed: Oct. 26, 1981

[30] Foreign Application Priority Data

Oct. 24, 1980 [DE] Fed. Rep. of Germany ....... 3040154

[51] Int. Cl.³ ............................................. F23C 11/00
[52] U.S. Cl. ...................................... 431/1; 431/356; 137/7
[58] Field of Search ................... 222/309, 142, 167, 3, 222/44; 48/180.1; 137/7, 99; 141/4, 105; 431/1

[56] References Cited

U.S. PATENT DOCUMENTS

| | | | |
|---|---|---|---|
| 350,313 | 10/1886 | Miller | 222/44 |
| 3,669,134 | 6/1972 | Dobritz | 137/7 |
| 4,189,070 | 2/1980 | Macosko et al. | 222/309 |
| 4,228,924 | 10/1980 | Gilbert | 222/309 |
| 4,269,327 | 5/1981 | Welch | 222/309 |

FOREIGN PATENT DOCUMENTS

| | | | |
|---|---|---|---|
| 1122817 | 8/1968 | United Kingdom | 222/3 |
| 1195135 | 6/1970 | United Kingdom | 222/309 |

Primary Examiner—Samuel Scott
Assistant Examiner—Allen J. Flanigan
Attorney, Agent, or Firm—Frishauf, Holtz, Goodman & Woodward

[57] ABSTRACT

A gas supply for feeding at least two components of a combustion mixture to a combustion chamber has gas dosing cylinders (16, 19) respectively for oxygen and fuel of which the gas filling pressures are controllable or adjustable by a pressure regulator (15) and a throttle valve (18) respectively. The mixture ratio of the gases can thus be changed between each filling of the dosing devices by control of the setting motor (35) of the pressure regulator. This setting can also change the filling pressure in the combustion chamber (10). The length of the piston stroke in the dosing cylinders can also be controlled.

8 Claims, 1 Drawing Figure

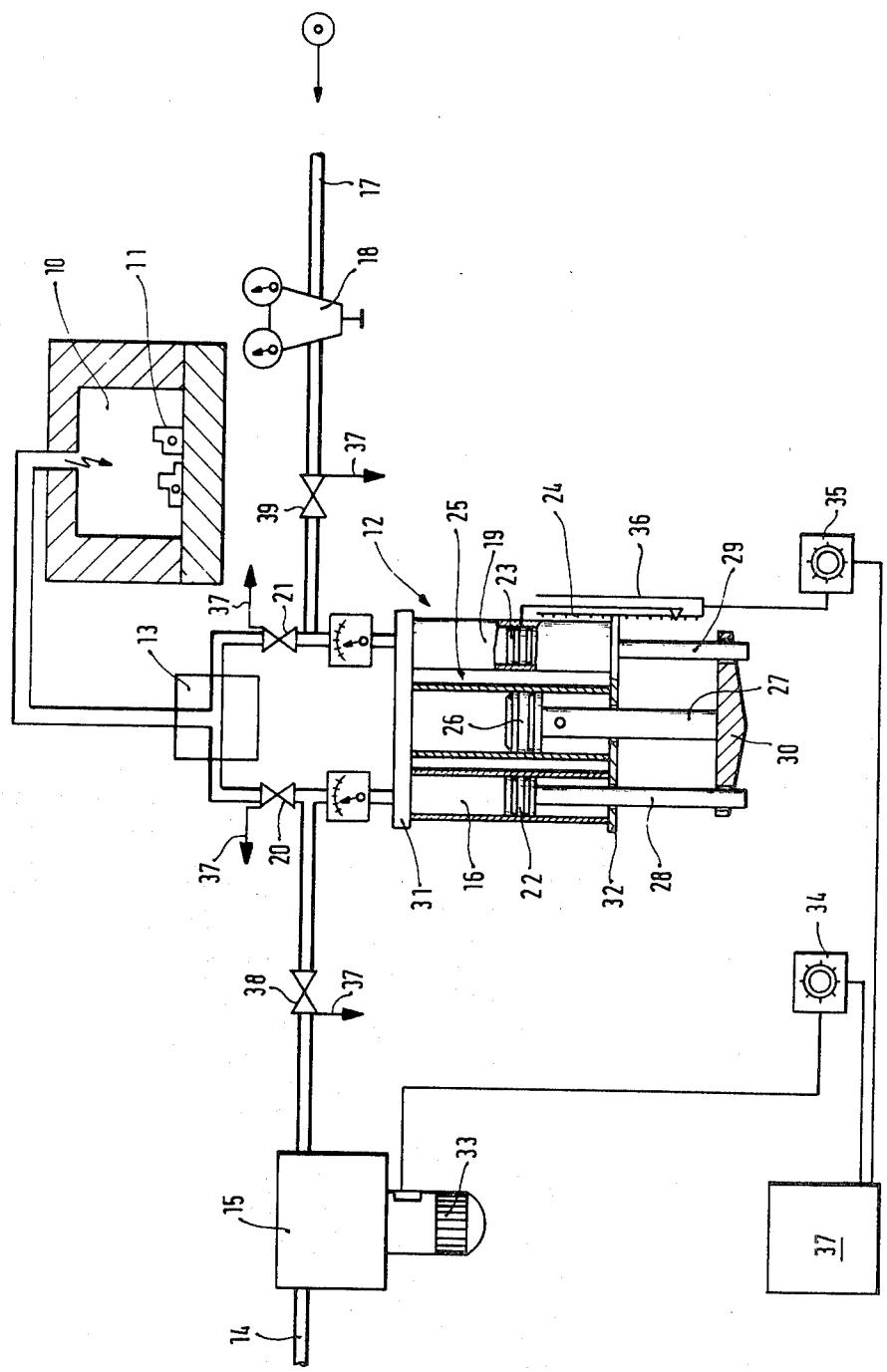

GAS SUPPLY DOSING DEVICE FOR EXPLOSIVE MIXTURES

This invention concerns a gas supply system for furnishing measured doses of an explosive mixture for detonation in a chamber such as the chamber of a thermal deburring machine.

In thermal deburring of workpieces there occurs an undesired amount of erosion resulting from the fact that the entire workpiece is exposed to thermal shock. Corners and edges are preferentially eroded because these locations take up particularly large amounts of heat having relatively large surface and small volume and are consequently oxidized or burnt. The thermal shock is produced by the combustion of a fuel and oxygen mixture, where hydrogen or natural gas (methane) is used as the fuel.

The gas components are admitted from supply containers into dosing cylinders serving the respective components and then by means of a pressure device are forced through valves into a combustion chamber under substantial compression, their mixture taking place in a separate mixing block the outlet of which leads to the combustion chamber.

The compression of the gas components is of the same magnitude for each component and towards the end of filling of the combustion chamber it corresponds to the pressure that is necessary there for optimizing the combustion process. The more the fuel-oxygen is compressed, the greater is the energy and the greater the deburring effect. The combustion temperature of the gas lies in the region from 2,500° to 3,500° C. When the pressure is raised the heat quantity set free per unit of volume increases. The pressures of fuel-oxygen mixture occurring in the deburring chamber lie around 40 bar during filling of the chamber.

In known installations the fuel components are introduced into the dosing cylinder and are thereafter brought into the combustion chamber by means of a piston in the dosing cylinder. This process can be repeated several times for building up pressure in the combustion chamber. This system has the disadvantage that a different dosing and mixing of the fuel gas component can be carried out automatically only within limits and, moreover, can be set or adjusted only by hand.

SUMMARY OF THE INVENTION

It is an object of the present invention to provide a gas supply system in which the components of the explosive gas mixture can be measured precisely again and again at proportions that can be set in with an accuracy that can be maintained by automatic machinery.

Briefly, a dosing cylinder is provided for each component of the mixture and the pistons are actuated to perform a stroke for charging the mixture into the combustion chamber in the filling cycle of the latter, at least one component being obtained at high pressure and being put through a pressure regulator that can adjustably be set before being introduced into the dosing cylinder so that the composition of the mixture can thereby be determined. In combination therewith, the stroke length of the pistons is preferably adjustable and can be regulated by measurement and control operating on all cylinders at once.

Preferably the pressure regulator is provided in the oxygen line supply for determining the filling pressure of the oxygen dosing cylinder and this regulator is controllable by a positioning motor, while the fuel line flow is put through a throttle that can be set.

Advantageous construction features for the dosing cylinder and its associated control equipment is further described in the detailed description that follows this summary.

The gas supply system of the invention has the advantage that any desired gas cylinder filling pressure can automatically be set and that thereby any desired fuel gas mixture can be provided in the combustion chamber. Proceeding on the basis of the physical law that mass is equal to the density times the volume, the invention makes use of the variation of both parameters (density, volume) for generating different quantity or mass ratios.

The preferred arrangement allows the fuel-oxygen mixture to be determined by providing one component at constant pressure into its dosing cylinder, while the second component is supplied by a pressure regulator only in a quite certain but variable amount to the other dosing cylinder. Different pressure ratios then are produced in the gas dosing cylinder by different densities of the gas components. In this manner by mixing the gas components the particularly desired gas mixture can be obtained. As a complement to this operation the piston stroke in the dosing cylinders and thereby the volume can also be varied. In this manner likewise a quantity variation of the gas mixture results. For safety reasons the fuel and oxygen cylinders should always be empty at the time of ignition, i.e. the piston should always be in its end (upper) position.

The constitution of the system with dosing cylinder tubes that are held between common flanges, and have pistons driven by a common yoke that is symmetrical in terms of power, by means of a hydraulic or pneumatic device, is particularly effective.

It is convenient to provide fixed coupling between the dosing cylinder piston rods so that variation of the gas quantity ratios by means of the pressure regulator provided in accordance with the invention will hold the prescribed volumes of gas components precisely.

The system of the invention is of course not limited to installations for thermal deburring of workpieces, since precise repetitive feeding of gas mixture doses has a wide range of applicability. For example such a system is applicable to the process of reticulating of foam material in the manner of German Pat. No. 1 504 096 or for the method of separating connected porous molds dosclosed in German Pat. No. 2 322 760. What is important is the treatment process to which a workpiece is subjected by means of an explosive gas mixture in a closed chamber.

BRIEF DESCRIPTION OF THE DRAWING

The invention is further described by way of illustrative example with reference to the annexed drawing, the single FIGURE of which is a schematic diagram of a gas supply system for a thermal deburring machine.

DESCRIPTION OF THE ILLUSTRATED EMBODIMENT the fuel-oxygen mixture required for deburring the workpieces 11 in the combustion chamber 10 are supplied to the combustion chamber by means of a dosing equipment 12 feeding the gases to a mixing block 13. The oxygen is supplied over the oxygen line 14 at a pressure of about 20 bar to a pressure regulator 15. The pressure regulator 15 can regulate the oxygen pressure in a stepless manner between 0 and 10 bar by means of a positioning motor 33 and supply oxygen at the pressure so set to the oxygen dosing cylinder 16. The positioning motor 33 is connected with a setting and shifting device 34, for example a potentiometer. Thus by shifting of the potientiometer 34 the pressure in the oxygen dosing cylinder 16 can be varied. The pressure is dependent upon the selected composition for the gas mixture required for treating the workpieces in the combustion chamber 10.

Fuel gas (e.g. hydrogen, natural gas, methane) is supplied by the fuel line 17 through a controllable throttle valve 18 to the fuel gas dosing cylinder 19 at a constant pressure, of e.g. 8 bar.

During the operation of filling the dosing cylinders 16 and 19 the valves 20 and 21 between the mixing block 13 and the dosing equipment 12 are closed. As a result of the gas pressure of the mixture components the pistons 22 and 23 are pushed into a particular position in the dosing cylinders 16 and 19. The displacement of the pistons 22 and 23 are sensed and terminated by means of a piston stroke measuring device 24. When the desired position of the pistons 22 and 23 and the desired pressure are reached, the supply lines 14 and 17 are closed by the valves 38 and 29, while the valves 20 and 21 between the mixing block and the dosing equipment 12 are open. The actuation of the valves can take place with appropriate timing under control of the control unit 37.

The dosing equipment 12 also includes a hydraulic or pneumatic cylinder 25 having a piston 26 and piston rod 27. The piston rods 28 and 29 of the dosing cylinders 16 and 19 are connected in fixed configuration with the piston rod 27 of the hydraulic or pneumatic cylinder 25 by means of a yoke 30. The invention thus provides an advantageous kind of coupling of so-called work cylinder 25 with load cylinders (dosing cylinders 16 and 19). The system is so constituted that it is force-symmetrical, which is to say that it remains free of mechanical moment, even at different and varying pressures. In this manner, a uniform mixing up of the gases pushed out by the dosing cylinders 16 and 19 is obtained. By applying force to the piston 26 by hydraulic or pneumatic means, the piston 26 is so moved in the cylinder 25 that this movement is effective on the pistons 22 and 23 of the dosing cylinders 16 and 19.

The desired composition of the gas mixture is set by setting the pressure regulator 15 by means of the position control motor 33. If for example the oxygen pressure is set at 8 bar by the pressure regulator 15 and the pressure in the fuel supply 17 is likewise 8 bar, the mixing ratio of the gas components is 1:1, if the volumes of the fuel and oxygen cylinders, i.e. their diameters, are equal. These could, however, also be made different. Certain workpieces must be treated a number of times with as many different mixtures at various gas pressures. This is for example necessary if workpieces must first be deburred with a certain mixture under a certain pressure and then a further finishing process or machine process is performed, after which the workpieces must again be deburred. The individual data can be stored in the control unit 37 and can be called out in specified sequence.

The dosing cylinders 16 and 19 for oxygen and fuel, as well as the cylinder for hydraulic or pneumatic means 25 are constituted as tubes that are firmly set in the flanges 31 and 32. This provides a particularly simple construction of the dosing equipment 12. The two flanges 31 and 32 are clamped together by a number of tension rods having threading at both ends for clamping nuts.

In the embodiment illustrated in the drawing the dosing cylinders 16 and 19 and the hydraulic or pneumatic device 25-27 for actuating the dosing cylinders, lie in a single plane. The invention contemplates, however the possibility of an arrangement of more dosing cylinders or a different arrangement of dosing cylinders. For example two identical dosing cylinders could be provided diagonally opposite at corners of a square and the device 25-27 could be arranged in the middle. Furthermore, in one plane on both sides of the hydraulic cylinder 25-27 a pair of oxygen cylinders 16 and a pair of fuel cylinders 19 could be symmetrically disposed. The invention further contemplates that the end flange 31 could have at least one gas supply connection for oxygen or fuel and that the supply to the individual dosing cylinders could take place through gas supplying lines within the connection flange 31. This has the advantage that the number of tubular threaded joints, and thus the possibilities of leaks, could be greatly reduced.

We claim:

1. A gas supply system for an apparatus of the kind that subjects material in a combustion chamber to thermal and pressure shock by ignition of an explosive mixture of gases, comprising:

a dosing cylinder for each of at least two components of said gas mixture, each of said cylinders having a piston therein for varying the volume of a dosing chamber in the cylinder, wherein the configuration of each piston and cylinder permits each dosing chamber to be virtually completely emptied of said gas mixture component so as to reduce the possibility of explosions;

means (25,26,27,30) for controllably displacing the pistons of said cylinders so as to charge said combustion chamber with said mixture during a filling cycle of said combustion chamber in a manner assuring that the charging of said chamber with said mixture terminates only when said dosing cylinders are emptied of said mixture components by said pistons;

means (17,18) for supplying one of said components to the said dosing cylinder (19) therefor at a first pressure which is constant, and means (15,33,34) interposed between a pressurized gas feed line (14) for another of said components and the said dosing cylinder (16) therefor, for regulating at a predetermined setting the pressure of gas filled into said last-mentioned cylinder (16) at a second pressure in a range of pressure extending to pressures above said first pressure, and for thereby determining the composition of said gas mixture.

2. A gas supply system for an apparatus of the kind that subjects material in a combustion chamber to thermal and pressure shock by ignition of an explosive mixture of gases, comprising:

a dosing cylinder for each of at least two components of said gas mixture, each said cylinder having a piston therein for varying the volume of a dosing chamber in the cylinder, wherein the configuration of each piston and cylinder permits each dosing chamber to be virtually completely emptied of said gas mixture component so as to reduce the possibility of explosions;

means (25,26,27,30) controllably displacing the pistons of said cylinders so as to charge said combustion chamber with said mixture during a filling cycle of said combustion chamber in a manner assuring that the charging of said chamber with said mixture terminates only when said dosing cylinders are emptied of said mixture components by said pistons;

means (17,18) for supplying one of said components to the said dosing cylinder (19) therefor at a preadjusted rate while the containing space in said cylinder expands and the piston therein moves back over its stroke length, to produce a pressure in the filled cylinder which is in a first pressure range and is constant regardless of the piston stroke length;

means (15,33,34) interposed between a pressurized gas feed line (14) for another of said components and the said dosing cylinder (16) therefor, for regulating at a predetermined setting the pressure of gas filled into said last-mentioned cylinder at a pressure in a second pressure range which is wider and extends to higher pressures than said first pressure range and for thereby contributing to the determination of the composition of said gas mixture, and means for adjustably (24,35,36) setting at identical values the length of the strokes of the respective pistons (22,23) of said cylinders for contributing to the determination of said gas mixture quantity and pressure.

3. A gas supply system as defined in claim 1 or claim 2 in which said means for regulating pressure of gas filled into said cylinder is connected to a supply of oxygen and a positioning motor (33) is provided for setting the pressure at which said regulating means regulates the pressure of oxygen supplied to a dosing cylinder.

4. A gas supply system as defined in claim 2 in which an adjustable throttle (18) is provided between a fuel gas supply line (17) and one of said dosing cylinders (17) serving for dosing fuel gas, for setting the rate at which fuel gas is filled into said one of said dosing cylinders.

5. A gas supply system as defined in claim 2 in which a piston displacement measuring device (24) and a mechanical adjustment device (35,36) are provided for measuring out the filling volume of said dosing chambers and a control unit (37) is provided for setting the respective quantities of gases to be transferred in one cycle by piston strokes of equal length to said combustion chamber.

6. A gas supply system as defined in claim 1 or claim 2 that subjects material in a combustion chamber to thermal and pressure shock by ignition of a two-component explosive gas mixture, in which said dosing cylinders include:

a first dosing cylinder (16) for oxygen having a first piston movable therein, and a second dosing cylinder (19) for fuel gas having a second piston movable therein, said pistons having piston rods respectively extending in the same direction from the pistons, flange plates (31,32) being provided between which said cylinders extend, for holding said cylinders at their ends, together with a yoke (30) connecting said piston rods for actuating them in unison and an additional piston, connected to said yoke for applying force symmetrically to said piston rods of said dosing cylinder pistons;

and in which system means are provided for driving said additional piston by fluid pressure in the direction for compressing gas in said dosing cylinders and forcing it towards said apparatus until said pistons reach corresponding ends of said cylinders and thereby substantially empty said cylinders respectively of oxygen and fuel.

7. A gas supply system as defined in claim 5, in which there are also a third dosing cylinder for oxygen and a fourth dosing cylinder for fuel, each provided with a piston and both extending between said flange plates, the axes of said four cylinders intersecting the midplanes of said flanges at the corners of a square, and in which said yoke and additional piston are common to the piston rods of all four of said dosing cylinders.

8. A gas supply system as defined in claim 5 or claim 6 in which the one of said flanges located at the end of each cylinder remote from said piston rods is equipped with a coupling for an oxygen line and at least one coupling for a fuel gas line and with duct means within said flange connecting said couplings respectively to oxygen and fuel gas dosing cylinders.

* * * * *